US008108523B2

(12) United States Patent
Kinder et al.

(10) Patent No.: US 8,108,523 B2
(45) Date of Patent: Jan. 31, 2012

(54) AUTOMATIC EXTENSION OF DISTRIBUTED MANAGED RANGES IN A MULTI-MASTER SYSTEM

(75) Inventors: Nathan G. Kinder, Castro Valley, CA (US); Simo S. Sorce, New York, NY (US)

(73) Assignee: Red Hat, Inc., Raleigh, NC (US)

( * ) Notice: Subject to any disclaimer, the term of this patent is extended or adjusted under 35 U.S.C. 154(b) by 212 days.

(21) Appl. No.: 12/371,097

(22) Filed: Feb. 13, 2009

(65) Prior Publication Data

US 2010/0211657 A1   Aug. 19, 2010

(51) Int. Cl.
*G06F 15/173* (2006.01)
(52) U.S. Cl. ...................................................... 709/226
(58) Field of Classification Search .................. 709/221, 709/226
See application file for complete search history.

(56) References Cited

U.S. PATENT DOCUMENTS
6,457,053 B1 * 9/2002 Satagopan et al. ............ 709/226

OTHER PUBLICATIONS

Fedora, "389 Directory Server—DNA Plugin Proposal", Aug. 2008, Internet: http://directory.fedoraproject.org/wiki/DNA_Plugin_Proposal, p. 1-3.*
Fedora directory server, DNA Plugin, http://directory.fedoraproject.org/wiki/DNA_Plugin, printed Mar. 11, 2009, pp. 1-6.
[MS-DRSR] Directory Replication Service (DRS) Remote Protocol Specification, [MS-SRSR]—v20091214, copyright 2009 Microsoft Corp. pp. 1, 19, 20, Release: Dec. 14, 2009.

* cited by examiner

*Primary Examiner* — Ajay Bhatia
*Assistant Examiner* — Taylor Elfervig
(74) *Attorney, Agent, or Firm* — Lowenstein Sandler PC

(57) ABSTRACT

A method and system for automatic extension of a distributed numeric range in a multi-master system are described. In one embodiment, each of a plurality of master servers is provided with a unique range of numeric values that can be assigned to clients. Each master server can dynamically extend its associated range when the range is about to be exhausted. For example, a first master server can send a range request to a second master server to obtain additional numeric values when the number of values in its associated range is below a threshold. After receipt of the additional numeric values from the second master server, the first master server updates its associated range and assigns the additional numeric values to the clients.

18 Claims, 5 Drawing Sheets

OPERATIONS OF A MASTER SERVER THAT RECEIVES A RANGE REQUEST

AUTOMATIC EXTENSION OF DISTRIBUTED MANAGED RANGES IN A MULTI-MASTER SYSTEM

TECHNICAL FIELD

The invention relates to the management of a data repository. In particular, the invention provides mechanisms to manage the assignment of numeric values in a data repository that can be updated by multiple master servers.

BACKGROUND

A multi-master system is a system where a single piece of information in a data repository can be updated by multiple master servers. The use of multiple master servers enhances the reliability of a system. If one master server fails, other master servers will continue to update the data repository. Master servers can be located in several physical sites, i.e., distributed across a network, to manage a data repository. An example of a master server is a Lightweight Directory Access Protocol (LDAP) directory server, which manages an LDAP directory stored in a data repository. LDAP is a standard computer networking protocol for querying and modifying entries in an LDAP directory. The LDAP directory may contain any sort of data, but most commonly contain identity, contact and authorization information for people and organizations. Access to data in an LDAP directory is provided by an LDAP server, which responds to commands from an LDAP client. For example, a client may create a new entry, delete an entry, rename an entry, modify an entry, or (most commonly) retrieve the attributes in an entry.

An LDAP directory presents a hierarchical view of the data in a data repository. Records are presented as a tree of entries, each entry identified uniquely within the hierarchy by its Distinguished Name ("DN"). Entries contain one or more attributes, which consist of an attribute description (an attribute type with zero or more options), plus one or more values of the attribute. For example, an attribute type might be "givenName", and its value might be a text string that is the given name of a person described by the record.

In a multi-master environment where each master server is an LDAP directory server, it is often more efficient for a client to submit an LDAP request to a nearby master server. The request may involve the assignment of a unique numeric value, such as a user ID for a new user account. Conventionally, each master server is allocated with a unique range of values that can be assigned to the clients. When a master server exhausts its range of values, it will reject the requests for new value assignments. However, other master servers may still have plenty of available values. As a result, administrator action is often necessary to manually redistribute the values evenly among the master servers. Thus, there is a need to develop operational techniques that can coordinate the allocation of numeric values among multiple master servers.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
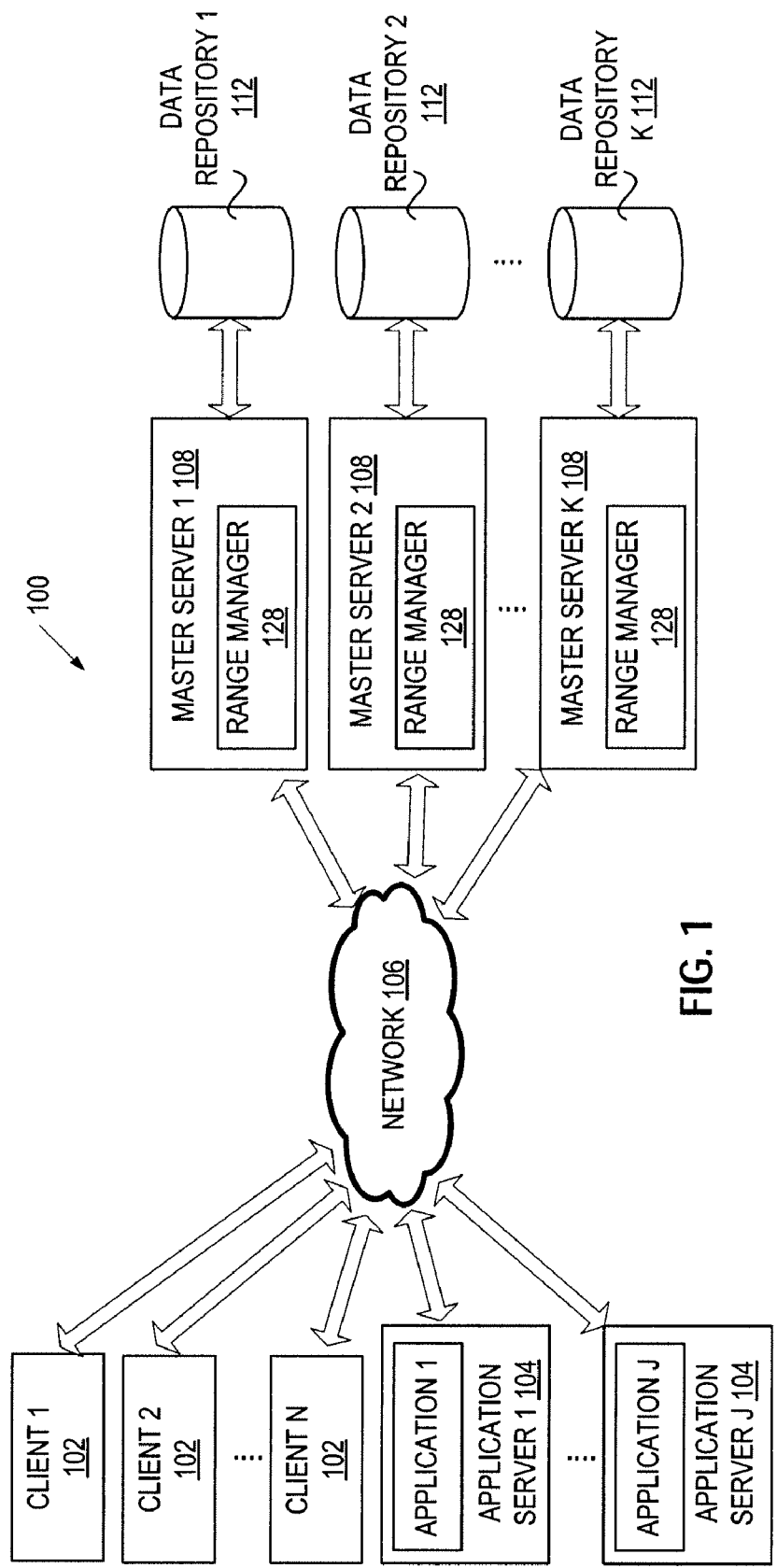
FIG. 1 illustrates a network architecture in which embodiments of the present invention may be implemented.

A method and system for automatic extension of a distributed numeric range in a multi-master system are described. In one embodiment, each of a plurality of master servers is provided with a unique range of numeric values that can be assigned to clients. Each master server can dynamically extend its associated range when the range is about to be exhausted. For example, a first master server can send a range request to a second master server to obtain additional numeric values when the number of values in its associated range is below a threshold. After receipt of the additional numeric values from the second master server, the first master server updates its associated range and assigns the additional numeric values to the clients.

According to one embodiment of the present invention, the transfer of numeric values among the master servers is automatic, without the need of user intervention. Each master server has access to shared configuration entries in its associated data repository. The shared configuration entries contain information about the master servers that service range requests, and the number of available values at each of these master servers. When a master server updates its local range of values (e.g., due to an assignment of a value or receipt of additional values from another master server), the corresponding change to the shared configuration entries will be automatically propagated to other master servers that are bound by a replication agreement. The master servers can use the information in the shared configuration entries to determine which master server to send a range request.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "sending", "storing", "assigning", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 illustrates an exemplary network architecture 100 in which embodiments of the present invention may operate. The network architecture 100 may include client devices 102 (also referred to as "clients"), a plurality of LDAP directory servers and a network 106. In one embodiment, each of the LDAP directory servers is a master server 108 that can read and modify the stored data in its associated data repository 112. Although it is not shown in FIG. 1, the network architecture 100 may additionally include a plurality of slave servers that can read but cannot modify the data in the data repositories 112. Each master server 108 may contain a server front-end responsible for network communications, plugins for server functions (such as access control and replication), a basic directory tree containing server-related data, and a database back-end plugin responsible for managing the storage and retrieval of repository data.

The clients 102 are coupled to the master servers 108 via the network 106, which may be a public network (e.g., Internet) or a private network (e.g., Ethernet or a local area Network (LAN)). The clients 102 may be, for example, personal computers (PCs), mobile phones, palm-sized computing devices, personal digital assistants (PDAs), etc.

In one embodiment, the clients 102 communicate with the master servers 108 via a web server (not shown). For example, the clients 102 may host web browsers that communicate with the web server using HTTP to request information. The web server may then communicate with the master servers 108 using LDAP to retrieve requested information from an associated data repository 112. Alternatively, the clients 102 may communicate directly with the master servers 108, using LDAP to request information stored in the data repository 112.

The network architecture 100 may also include one or more application servers 104 that host various applications requesting information from the master servers 108. The application servers 104 operate as clients in communications with the master servers 108. Similarly to the clients 102, the application servers 104 may communicate with the master servers 108 directly or via a web server.

In one embodiment, each data repository 112 may contain a tree of data entries. The structure of the entries may be specified in the definition of the data repository 112. The definition of the LDAP repository 112 may be represented as a schema, a table or some other data structure, and may reside independently or inside the data repository 112. For example, the schema may be included in the data repository 112 as a collection of LDAP repository entries rooted at the base DN (distinguished name) with cn=schema. The schema may define object classes and attributes associated with each object class. Each entry in the LDAP repository has an objectClass attribute, containing one or more classes defined in the schema. The schema definition for each class an entry belongs to defines what kind of object the entry may represent (e.g., a person, organization or domain). Each data repository 112 may be part of its associated master server 108, may reside externally (e.g., on a database server), or may reside on data storage accessible by the associated master server 108. In one embodiment, the data repositories 112 contain replicated LDAP data entries.

According to one embodiment of the present invention, each master server 108 includes a range manager 128 to manage one or more unique ranges of numeric values. For example, the client 102 can request one of the master servers 108 for assignment of a new user ID. In response, the range manager 128 checks the available numeric values in the local range for user IDs, and determines whether the local range has a sufficient number of available values. If there is insufficient number of available values, the range manager 128 can send a range request to another master server 108 to obtain additional values. Thus, the ranges maintained by each master server 108 can be automatically extended as necessary.

Figure 2:
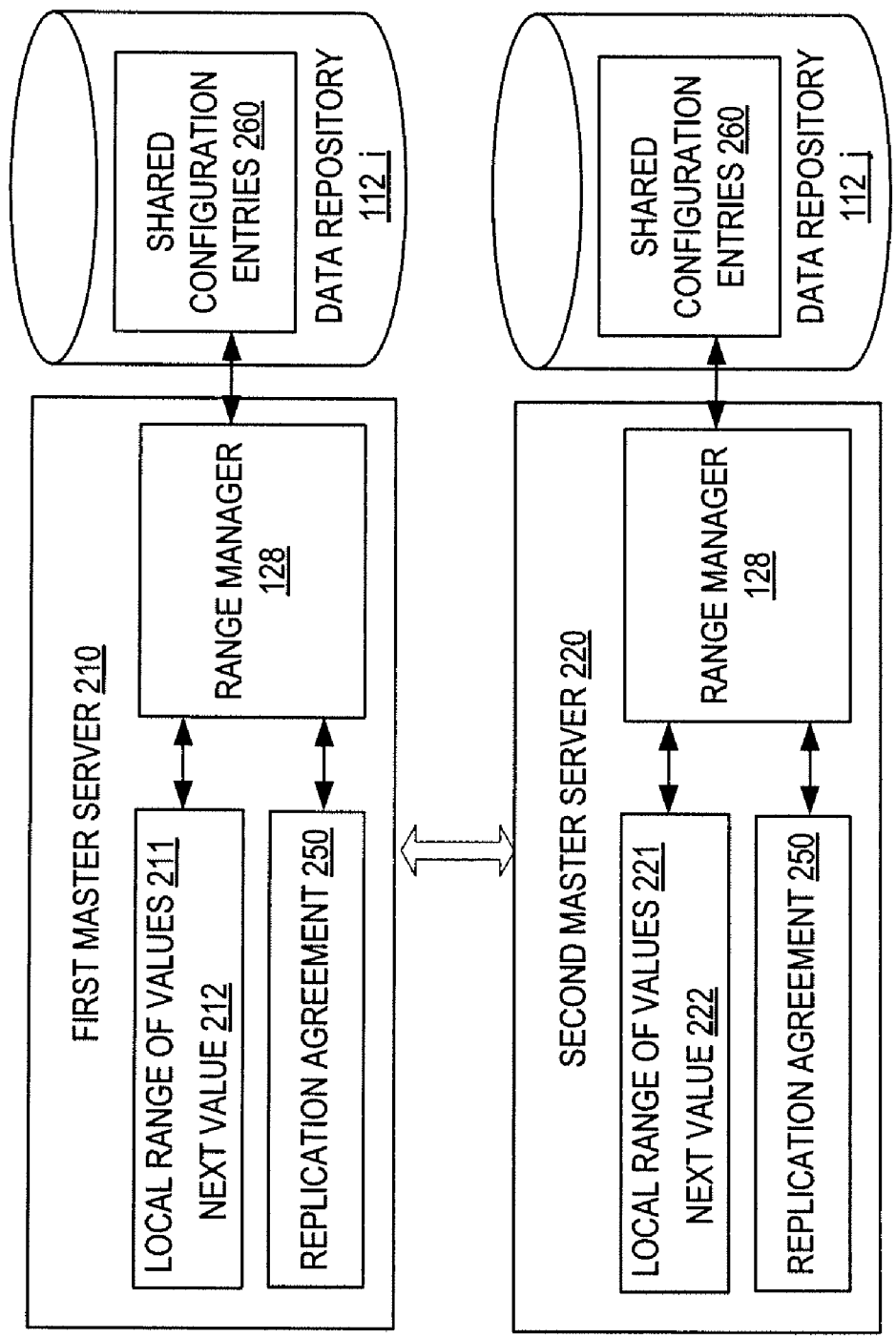
FIG. 2 is a block diagram illustrating one embodiment of a range manager in a master server.

FIG. 2 illustrates an embodiment of a first master server 210 and a second master server 220, which can be any two of the master servers 108 of FIG. 1. In the embodiment, each master server (210, 220) includes the range manager 128 to manage a local range of numeric values (211, 221). Each local range (211, 221) is unique in that no identical numeric value exists in different local ranges. A value in the local range of values (211, 221) may be designated as a next value (212, 222), which can be assigned when a next assignment request arrives. Although only one local range is shown, it is understood that each master server can maintain multiple local ranges, each local range for a different purpose (e.g., one range for user IDs, another range for group IDs, etc.). The local range of values (211, 221) may be stored on the master servers (210, 220), in the data repository (112_i, 112_j), or on some other device and/or program accessible to the master server (210, 220).

Each master server (210, 220) also includes a replication agreement 250 that is mutually agreed upon among the master servers (e.g., all of the master servers 108). The replication agreement 250 may be located on each master server (210, 220), in the data repository (112_i, 112_j), or on some other device and/or program accessible to the master server (210, 220), or may be an independent module implemented in hardware, software or a combination thereof.

In accordance with one embodiment of the present invention, the replication agreement 250 contains a mechanism to automatically propagate any change to shared configuration entries 260 made by one master server to all of the other master servers that are bound by the same replication agreement 250. For example, if the first master server 210 updates an entry in the shared configuration entries 260 stored in its associated data repository 112_i, the update will be automatically propagated to the shared configuration entries 260 stored in the data repository 112_j associated with the second master server 220. In one embodiment, the shared configuration entries 260 contain, for each master server, the number of available values in the local range. In alternative embodiments, the shared configuration entries 260 may contain additional information, such as the values in the local range of a master server. The shared configuration entries 260 can be stored according to a pre-defined LDAP schema and identified by a distinguished name (DN).

The range manager 128 can request its local range be extended by sending a range request to another master server. For example, the range manager 128 of the first master server 210 can send a range extension extended operation to the second master server 220. The contents of this extended operation are a DN that identifies the range. In this case, the DN that identifies the range is the DN of the container for the shared configuration entries 260 for a particular range. If the second master server 220 manages a range that is configured to use the same DN, the second master server 220 first determines that it has enough values to transfer (e.g., above a threshold). If the number of available values at the second master server 220 is above a threshold, the second master server 220 responds with a lower and upper value, which define the range to be transferred to the first master server 210. The second master server 220 transfers a portion of its available values, which, for example, may be the top half of its local range. The range manager 128 of the second master server 220 determines the number of values to be transferred, such that the remaining values in its local range can stay above a threshold.

In one embodiment, a master server processes a range request only if a requesting master server is bound as a replication bind DN. A replication bind DN is a special user account that is created for the master servers that agree to replicate changes to the shared configuration entries 260. The use of the special user account restricts the range transfer to the master servers that are bound by the replication agreement 250. A requesting master server can obtain the replication bind DN and other necessary credentials from the replication agreement 250. The replication agreement 250 may be configured to use the secure socket layer (SSL) or certificate client authorization to ensure security of the access to the replication bind DN and credentials.

In one embodiment, when the first master server 210 receives additional values from the second master server 220, the first master server 210 stores the additional values in its local range of values 211 as the next range to use. The next range can be a list of values separate from the list of available values in its current range, and can be temporarily made inactive. Once the current range is fully exhausted, the next range can be made active. In some scenarios, an administrator can manually add a new range to the local range of a master server. The new range can be used when the current range is exhausted.

Figure 3:
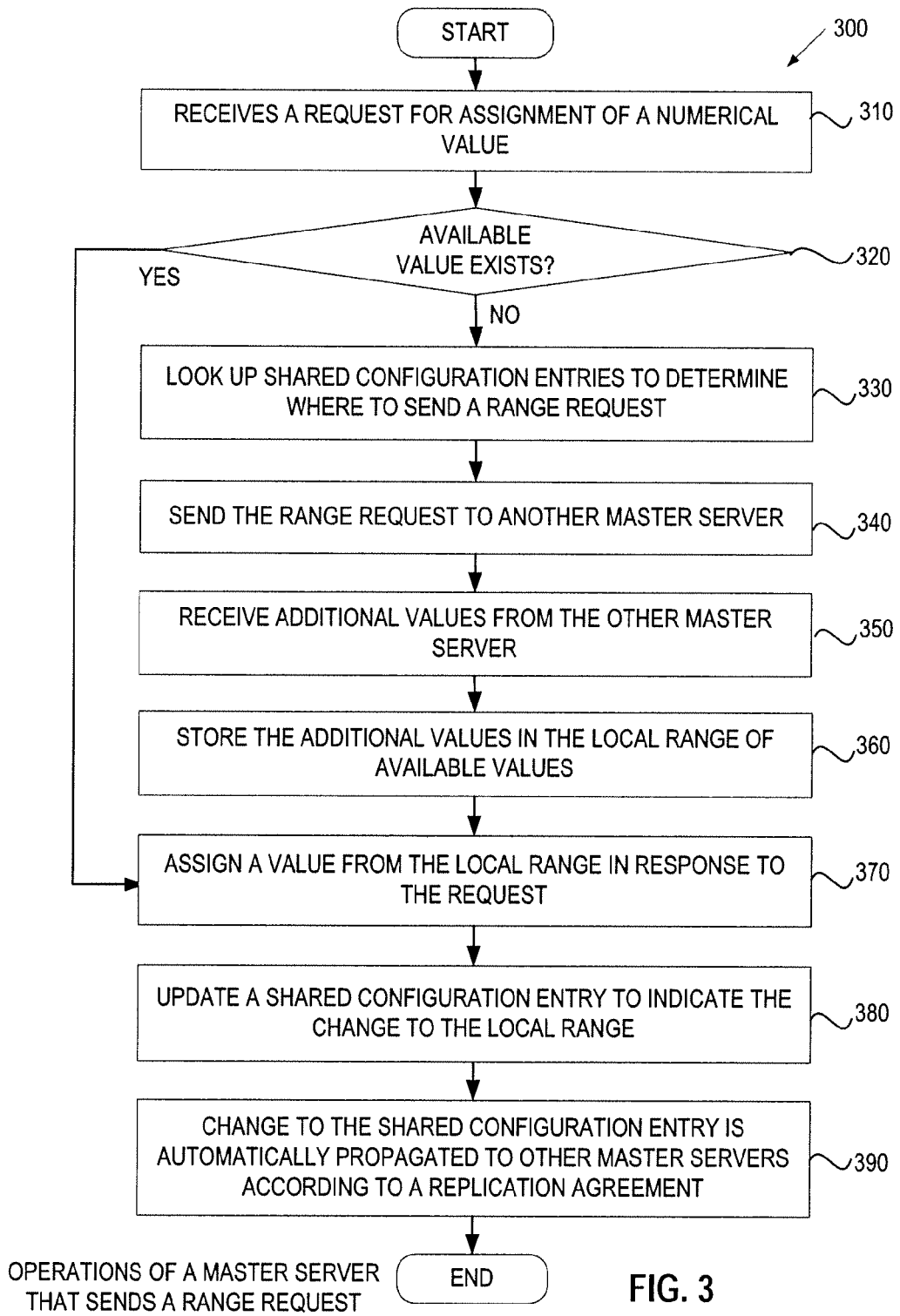
FIG. 3 is a flow diagram illustrating a method of a master server that sends a range request to extend its local range according to one embodiment of the present invention.

FIG. 3 is a flow diagram that illustrates a method 300 for extending a range of numeric values assigned to a master server according to one embodiment of the present invention. The method 300 may be performed by the processing logic 526 of FIG. 5 that may comprise hardware (e.g., circuitry, dedicated logic, programmable logic, microcode, etc.), software (such as instructions run on a processing device), or a combination thereof. In one embodiment, the method 300 is performed by the master server 210 of FIG. 2, which can be any of the master servers 108 of FIG. 1.

Referring to FIG. 3, at block 310, the first master server 210 receives a request from a client. The request triggers the first master server 210 to assign a value from a local range of values (e.g., a range of user IDs). At block 320, the first master server 210 determines whether there are any available values in the local range. Alternatively, the first master server 210 may determine whether the number of available values in the local range is below a threshold. If there is an available value in the local range (or the number of available values is not below a threshold), the first master server 210 at block 370 assigns a value from the local range in response to the request. Otherwise, at block 330, the first master server 210 looks up shared configuration entries 260 to determine where to send a range request. The shared configuration entries 260 indicate which other master servers can service the request, as well as the number of available values in their respective local ranges. The first master 210 may obtain a prioritized list of master servers based on the number of values available at these servers. Using the prioritized list, the first master server 210 selects one master server that has the most number of available values in its local range to send the range request. At block 340, the first master server sends the range request to the selected master server (e.g., the second master servers 220). At block 350, the first master server 210 receives additional values from the second master server 220. At block 360, the first master server 210 stores the additional values into its local range. At block 370, the first master server 210 assigns one of the values from the local range in response to the client's request.

Continuing to block 380, the first master server 210 updates an entry in the shared configuration entries 260 to indicate a change due to the assignment made in block 370. If the first master server 210 received additional values from another master server at block 350, the update will also reflect the received additional values. The first master server 210 may update a shared configuration entry to indicate the current number of available values in the local range. In some embodiments, the first master server 210 may also update a shared configuration entry to include the values that are currently available in its local range. At block 390, the change to the shared configuration entry is automatically propagated to other master servers according to a replication agreement.

Figure 4:
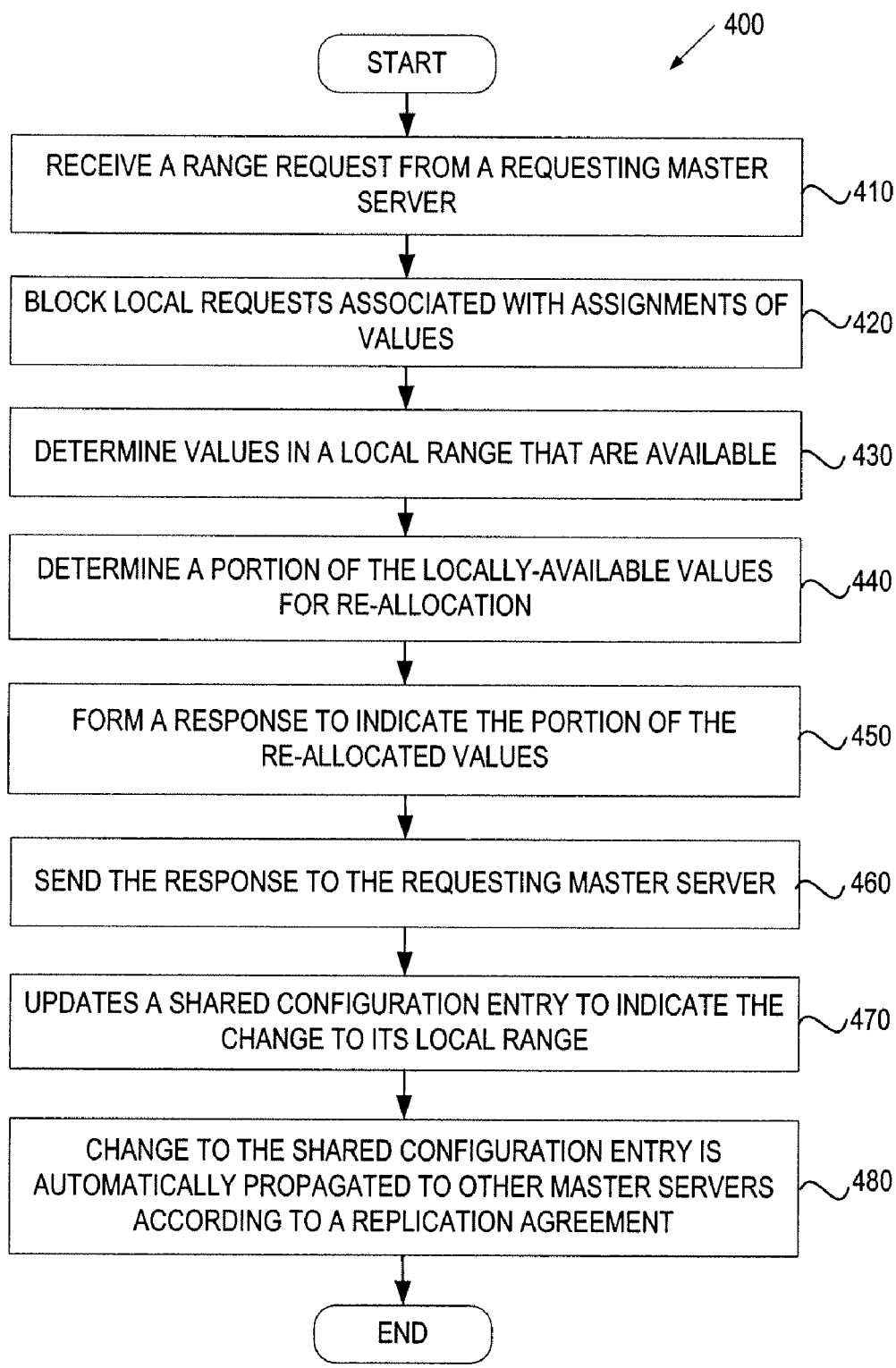
FIG. 4 is a flow diagram illustrating a method of a master server responding to the range request according to one embodiment of the present invention.

FIG. 4 illustrates a flow diagram of one embodiment of a method 400 for dynamically transferring a range of values by a master server that receives a range request. The method 400 may be performed by the processing logic 526 of FIG. 5 that may comprise hardware (e.g., circuitry, dedicated logic, programmable logic, microcode, etc.), software (such as instructions run on a processing device), or a combination thereof. In one embodiment, the method 400 is performed by the master server 220 of FIG. 2, which can be any of the master servers 108 of FIG. 1.

Referring to FIG. 4, at block 410, a responding master server (e.g., the second master server 220) receives a range request from a requesting master server (e.g., the first master server 210). The second master server 220 may determine to respond only if the request is sent from a master server that is bound by a replication agreement. At block 420, the second master server 220 blocks all local requests that may trigger an assignment of a value from the requested range. At block 430, the second master server 220 determines the available values in its local range. At block 440, the second master server 220 determines a portion of the locally-available values for re-allocation. The determination can be made according to a pre-determined agreement among the master servers (e.g., half of the number of available values), or according to the individual situation of the responding master server. At block 450, the second master server 220 forms a response to indicate the values, or the range of values, to be transferred. At block 460, the second master server 220 sends the response to the first master server 210. At block 470, the second master server 220 updates an entry in the shared configuration entries 260 to indicate a change to its local range due to the transfer. The second master server 220 can update a shared configuration entry to indicate the current number of available values in its local range. In some embodiments, the second master server 220 may also update a shared configuration entry to indicate the values that are currently available in its local range. At block 480, the change to the shared configuration entry is automatically propagated to other master servers according to a replication agreement.

Figure 5:
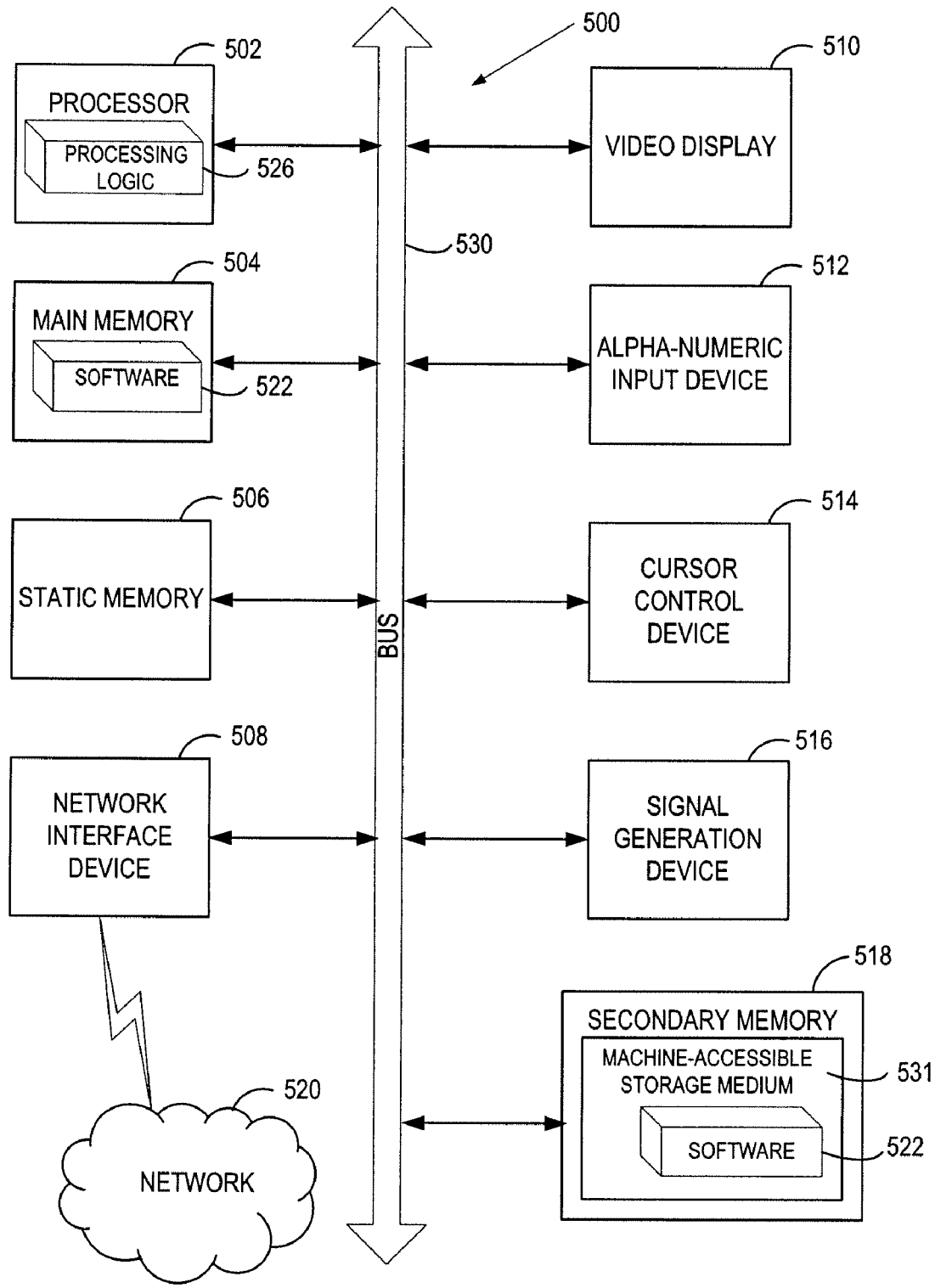
FIG. 5 illustrates a block diagram of an exemplary computer system implementing some embodiments of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-readable storage media. The software 522 may further be transmitted or received over a network 520 via the network interface device 508.

The machine-readable storage medium 531 may also be used to store the data repository 112 and/or the local range of values (211, 221) of FIG. 1 and FIG. 2. While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method, implemented by each of a plurality of master servers programmed to perform the following, comprising:

obtaining, by a first server of the master servers, information shared by the master servers that indicates how many numeric values are available at each of the master servers, each master server allocated with a unique range of numeric values and authorized to modify a data repository that stores the shared information, each of the numeric values to be assigned to a new user account as a user ID or a new group account as a group ID according to the Lightweight Directory Access Protocol (LDAP);

selecting, by the first server, from the shared information, one server among the master servers that has the most number of available numeric values as a second server;

sending, by the first server, a range request to the second server to dynamically extend the unique range of numeric values associated with the first server, the range request comprising a distinguished name (DN) that identifies a requested range, wherein, if the second server determines that it is managing the requested range and that the number of its available numeric values is above a threshold, the second server assigns a sub-range from its available numeric values such that the number of remaining available numeric values at the second server stays above the threshold; and after receipt of the sub-range of numeric values from the second server, storing, by the first server, the sub-range of numeric values in the data repository.

2. The method of claim 1, wherein the plurality of master servers are Lightweight Directory Access Protocol (LDAP) directory servers and the numeric values are associated with entries of an LDAP directory.

3. The method of claim 1, wherein sending a range request further comprises:
sending an LDAP extended operation pre-defined for requesting the additional numeric values.

4. The method of claim 1, wherein updating the information about the unique range further comprises:
propagating an updated number of available numeric values in the unique range associated with the first server from the first server to the master servers that have established a replication agreement with the first server.

5. The method of claim 1, further comprising:
sharing a plurality of configuration entries among the master servers, the configuration entries indicating, for each master server, the number of available numeric values at the master server; and
determining where to send the range request, at the first server, by looking up the configuration entries.

6. The method of claim 1, further comprising:
responding to a request for range extension only if the request is sent from a master server that is bound by a replication agreement.

7. A system comprising:
a plurality of data storage to store a data repository that contains information shared by a plurality of master servers that indicates how many numeric values are available at each of the master servers; and
the master servers, each of the master servers coupled to and authorized to modify data in one of the data storage, each of the master servers allocated with a unique range of numeric values, each of the numeric values to be assigned to a new user account as a user ID or a new group account as a group ID according to the Lightweight Directory Access Protocol (LDAP), and each of the master servers operative to dynamically extend its associated unique range by transmission of a range request to another master server, which is selected based on the shared information as having the most number of available numeric values, wherein the range request comprises a distinguished name (DN) that identifies a requested range,
wherein, in response to the range request sent from a first server of the master servers to a second server of the master servers, the second server is operative to determine that it is managing the requested range and that the number of its available numeric values is above a threshold, the second server is further operative to assign a sub-range from its available numeric values such that the number of remaining available numeric values at the second server stays above the threshold, and
wherein after receipt of the sub-range of numeric values from the second server, the first server is configured to store the sub-range of numeric values in the data repository.

8. The system of claim 7, wherein the plurality of master servers are Lightweight Directory Access Protocol (LDAP) directory servers and the numeric values are associated with entries of an LDAP directory.

9. The system of claim 7, wherein each master server is coupled to one of the data storage that stores a copy of shared configuration entries, the shared configuration entries to indicate, for each master server, the number of available numeric values at the master server.

10. The system of claim 7, wherein the master servers have established a replication agreement to propagate a change in the information about the unique range associated with one of the master servers to others of the master servers.

11. The system of claim 7, each master server further comprises:
a range manager to send the range request when the number of available numeric values in the unique range associated with the master server is below a threshold.

12. The system of claim 7, each master server further comprises:
a range manager to respond to the range request when the range request is sent from a master server that is bound by a replication agreement.

13. A non-transitory computer readable storage medium including instructions that, when executed by a processing system, cause the processing system to perform a method comprising;
obtaining, by a first server of a plurality of master servers, information shared by the master servers that indicates how many numeric values are available at each of the master servers, each of the master servers allocated with a unique range of numeric values and authorized to modify a data repository that stores the shared information, each of the numeric values to be assigned to a new user account as a user ID or a new group account as a group ID according to the Lightweight Directory Access Protocol (LDAP);
selecting, by the first server, based on the shared information one server among the master servers that has the most number of available numeric values as a second server;
sending, by the first server, a range request to the second server to dynamically extend the unique range of numeric values associated with the first server, the range request comprising a distinguished name (DN) that identifies a requested range, wherein, if the second server determines that it is managing the requested range and that the number of its available numeric values is above a threshold, the second server assigns a sub-range from its available numeric values such that the number of remaining available numeric values at the second server stays above the threshold; and
after receipt of the sub-range of numeric values from the second server, storing, by the first server, the sub-range of numeric values in the data repository.

14. The computer readable storage medium of claim 13, wherein the plurality of master servers are Lightweight Directory Access Protocol (LDAP) directory servers and the numeric values are associated with entries of an LDAP directory.

15. The computer readable storage medium of claim 13, wherein sending a range request further comprises:

sending an LDAP extended operation pre-defined for requesting the additional numeric values.

16. The computer readable storage medium of claim 13, wherein updating the information about the unique range further comprises:

propagating an updated number of available numeric values in the unique range associated with the first server from the first server to the master servers that have established a replication agreement with the first server.

17. The computer readable storage medium of claim 13, further comprising:

sharing a plurality of configuration entries among the master servers, the configuration entries indicating, for each master server, the number of available numeric values at the master server; and determining where to send the range request, at the first server, by looking up the configuration entries.

18. The computer readable storage medium of claim 13, further comprising:

responding to a request for range extension only if the request is sent from a master server that is bound by a replication agreement.

* * * * *